(12) United States Patent
Sakamoto et al.

(10) Patent No.: US 6,352,804 B1
(45) Date of Patent: Mar. 5, 2002

(54) BLACK MATRIX OF RESIN, METHOD FOR PRODUCING THE SAME, METHOD FOR PRODUCING COLOR FILTER USING THE SAME, AND LIQUID CRYSTAL ELEMENT PRODUCED BY THE SAME COLOR FILTER PRODUCTION METHOD

(75) Inventors: Junichi Sakamoto, Yokohama; Nagato Osano, Kawasaki; Kenichi Iwata, Tokyo; Satoshi Kokubo, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,562

(22) Filed: Nov. 4, 1999

(30) Foreign Application Priority Data

Nov. 6, 1998 (JP) ............................................ 10-330281

(51) Int. Cl.$^7$ .......................... G02B 5/20; G02F 1/1335
(52) U.S. Cl. .................................... 430/7; 349/106
(58) Field of Search ............................ 430/7; 349/106

(56) References Cited

U.S. PATENT DOCUMENTS 5,498,498 A * 3/1996 Uchikawa et al. ............ 430/7
5,817,441 A 10/1998 Iwata et al. ................. 430/7
5,853,952 A * 12/1998 Ushirogouchi et al. .. 430/270.1
5,888,679 A 3/1999 Suzuki et al. ................. 430/7
6,042,974 A 3/2000 Iwata et al. ................. 430/7

FOREIGN PATENT DOCUMENTS

JP           3-252622         11/1991

* cited by examiner

*Primary Examiner*—John A. McPherson
(74) *Attorney, Agent, or Firm*—Fitzpatrick, Cella, Harper & Scinto

(57) ABSTRACT

A black matrix of resin, as a constituent member of a color filter for, e.g., displays of color TV sets and personal computers, method for producing the black matrix of resin, method for producing a color filter using the same black matrix, and liquid crystal element using the color filter produced by the same method. The method of the present invention for producing a black matrix of resin is characterized by comprising forming a resin on a substrate, exposing the above resist at an exposure of 14.0 to 70.0 mJ/cm$^2$ via a photomask and developing the exposed resist to produce a pattern.

7 Claims, 14 Drawing Sheets

BLACK MATRIX OF RESIN, METHOD FOR PRODUCING THE SAME, METHOD FOR PRODUCING COLOR FILTER USING THE SAME, AND LIQUID CRYSTAL ELEMENT PRODUCED BY THE SAME COLOR FILTER PRODUCTION METHOD

BACKGROUND OF THE INVENTION

1. Field of the Invention

The present invention relates to a black matrix of resin, as a constituent member of a color filter for, e.g., displays of color TV sets and personal computers, method for producing the black matrix of resin, method for producing a color filter using the same black matrix, and liquid crystal element using the color filter produced by the same method.

2. Related Background Art

One of the conventional methods for producing color filters for color-displaying liquid crystal elements is the so-called proximity exposure followed by development to produce patterns, where a negative color resist formed on a transparent substrate is irradiated with light at a certain exposure via a photomask apart from the resist at a certain distance (proximity exposure gap). Exposure is normally set at 100 mJ/cm$^2$ or more, to sufficiently cure the resist.

Recently, use of black matrix as a black resist has been investigated, in order to shield light between adjacent colored portions in a color filter. A black matrix is a resist dispersed with light-shielding pigment, e.g., carbon black. As a result, the resist cannot sufficiently pass light for pattern exposure, and is considered to need an exposure of several hundreds mJ/cm$^2$ (higher than that for the above-mentioned color resist) to be cured. In addition, the black resist contains larger quantities of sensitizer and reaction initiator than a pigment-free resist, in order to enhance its exposure sensitivity. Therefore, it is cured with a small quantity of light, e.g., diffracted light, making it difficult to accurately transfer an opening in a photomask to produce patterns.

One of the methods to solve the above problems involved in production of black resists is disclosed by Japanese Patent Application Laid-Open No. 3-252622. It tries to control uneven film thickness after development by exposure from the back side of a color filter coated with a black resist after having formed the color filter, and also instantaneous exposure from the front side and simultaneous patterning to improve surface strength. In this method, shape of the black matrix depends on color filter forming accuracy, although essentially free of the problems caused by diffracted light. Moreover, this method is inapplicable to an ink jet type color filter production method, because it forms a colored section (filter) using a black matrix of resin as the wall to prevent color contamination, and hence formation of the black matrix must precede that of the colored section.

The black matrix for production of active matrix type liquid crystal elements incorporating a thin-film transistor (TFT), the so-called TFT type liquid crystal elements, tends to have an opening of complex shape, because of importance of resistance of the TFT to light and brightness of the color filter. The black matrix for TFT type liquid crystal elements is shaped in such a way to make part of the line patterns finer, in order to shield light for the TFT and secure a required opening ratio. The photomask for forming such complex patterns involves complex patterns of diffracted light, and complex and distorted outer appearance shape of the exposed section of the resist. It is therefore not suited as a product.

Contact exposure, i.e., exposure with no gap between the photomask and resist, can prevent the problems caused by diffracted light. However, it is inadequate for mass production of color filters, because of problems, e.g., contamination of the masks and reattachment of dust to resist surfaces, when it is adopted for color filters being continuously produced.

As discussed above, pattern exposure of a negative black resist by proximity exposure also gives rise to exposure around a mask opening by diffracted light, causing problems, e.g., distortion of developed black matrix patterns and excessively increased line width.

SUMMARY OF THE INVENTION

It is an object of the present invention to solve the above problems and produce a black resist faithfully reflecting photomask shapes by reducing the effects of diffracted light in proximity exposure. It is another object of the present invention to provide a high-quality color filter and liquid crystal element using the above black resist.

The method of the present invention for producing a black matrix of resin is characterized in that it comprises 3 steps of forming a resist on a substrate, exposing the above resist at an exposure of 14.0 to 70.0 mJ/cm$^2$ via a photomask, and developing the exposed resist to produce a pattern.

The method of the present invention can produce a pattern faithfully reflecting mask shapes, even when opening shape of a black matrix is complex with irregularities.

DETAILED DESCRIPTION OF THE PREFERRED EMBODIMENTS

Figure 1A:
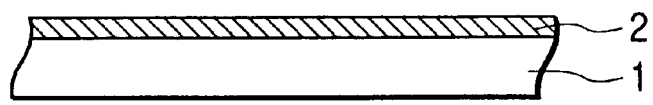
FIGS. 1A, 1B, 1C, 1D and 1E illustrate steps of the method of the present invention for producing color filters.
Figure 1B:
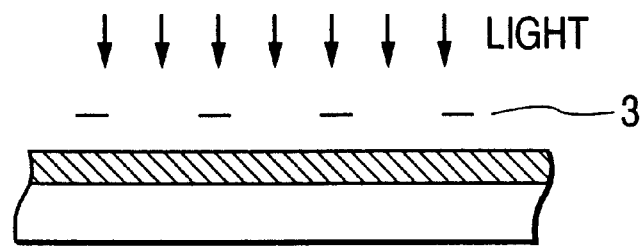
Figure 1C:
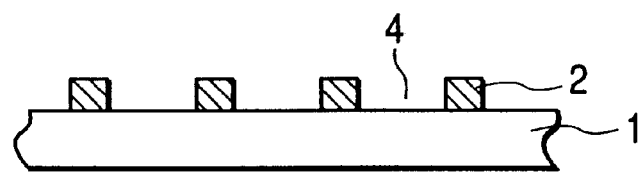
Figure 1D:
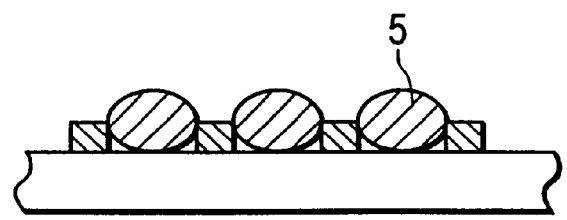
Figure 1E:
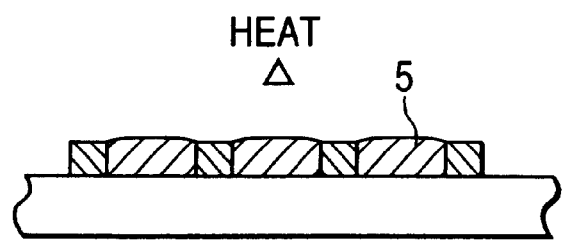

The method of the present invention for producing color filters comprises the following steps (a) to (e), which are illustrated in FIGS. 1A to 1E, respectively.

Step (a)

A transparent substrate 1 is coated with a photosensitive resin composition 2, black in color, by an adequate method, e.g., spin coating, dye coating or dip coating to a thickness needed to shield light, eg., 1 μm or so. The transparent substrate is normally of glass, but may be of plastic film or sheet. The transparent substrate may be coated; as required, beforehand with a thin film to enhance adhesion of the black matrix and colored ink to the substrate.

Step (b)

The coating film over the transparent substrate is temporarily cured by e.g., a hot plate, and exposed using an exposure device which emits light of wavelength matching sensitivity of the photosensitive resin composition and a mask 3 of given pattern.

Step (c)

The exposed coating film is developed, i.e., the portion shielded by a mask 3 during the exposure step is eluted out by the developer, exposing the substrate, to leave behind the light-exposed portions, which form a black matrix pattern. The coating substrate is rinsed to remove the residual developer, and dried by a simple procedure, e.g., spin drying or drying with air knife. The substrate has a clean surface with a black matrix apart from another one at a gap 4.

Step (d)

An ink 5 of given color is spread in black matrix gaps 4, by a common printing procedure, e.g., offset, gravure or screen printing. Ink jet printing, which is effected by an ink jet printer, is particularly preferable, because it uses no plate for printing and hence realizes high-accuracy patterning by controlling ink Jet droplet size. The ink jet tends to be repelled by the black matrix pattern, and must be adequately selected from those wettable with the black matrix gaps (image elements). The ink may be dye- or pigment-based, and the solvent therefor comprises water as the major ingredient, and may be incorporated with a hydrophilic organic solvent.

A thermosetting ink is preferable for the present invention, because curing of the ink and final curing of the black matrix can be effected by the same step.

It is preferable that the thermosetting component for the ink and black matrix are cured at similar temperature levels. The thermosetting component can be selected from acrylic, epoxy, phenolic and enthiol resins. The resin may be incorporated with an aromatic amine or acid anhydride, depending on required process temperature.

Step (e)

The black matrix is completed after it is heated/dried (post baking) for curing. It is preferable to simultaneously cure the ink during this step. It is coated with a protective film, as required.

The black, photosensitive resin composition for the black matrix contains a black pigment or dye and photosensitive material, and may also contain a non-photosensitive resin, as required. The photosensitive materials useful for the present invention include UV resists, DEEP-UV resists and resins curable with ultraviolet ray.

The UV resists useful for the present invention include negative resists, e.g., cyclopolyisoprene/aromatic bisazide-based and phenolic resin/arimatic azide-based resists.

The DEEP-UV resists useful for the present invention include negative resists, e.g., polyvinylphenol-3,3'-diazidediphenyl sulfone and glycidyl polymethacrylate.

The resin curable with ultraviolet ray, useful for the present invention, include polyester acrylate, epoxy acrylate and urethane acrylate containing approximately 2 to 10 wt. % of at least one type of photopolymerization initiator selected from the group consisting of benzophenone and its substituted derivatives, acetophenone and its substituted derivatives, and oxime compounds, e.g., benzyl.

The black, photosensitive resin composition is dispersed in a mixed solvent composed of a low-boiling and high-boiling solvents, before being spread over the substrate.

The low-boiling solvents useful for the present invention include butyl acetate and propylene glycol monomethyl ether (PGME). The high-boiling solvents useful for the present invention include propylene glycol monomethyl ether acetate (PGMEA), ethyl cellosolve acetate (ECA) and 3-methoxy butyl acetate (MBA). The high-boiling solvent accounts for at least 50% of the mixed solvent.

Figure 2:
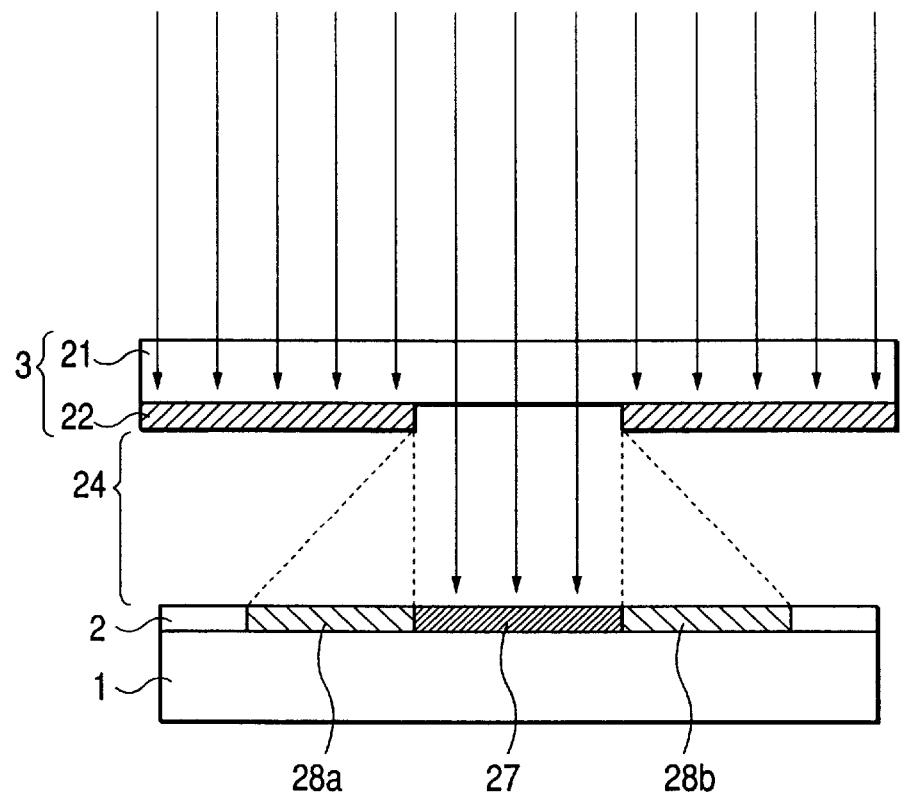
FIG. 2 is a schematically illustrates proximity exposure of a negative resist.

The method of the present invention is characterized by proximity exposure of a negative black resist at a very low exposure of 14.0 to 70.0 $mJ/cm^2$ on the black resist surface. In contrast, the conventional method needs an exposure of normally 100 $mJ/cm^2$ or more, generally several hundreds $mJ/cm^2$. FIG. 2 schematically illustrates proximity exposure carried out for a negative resist, where 3: photomask, composed of a quartz substrate 21 coated with a light-shielding film 22 of chromium, 1: transparent substrate on which a black matrix is formed, 2: negative resist to be patterned, 24: gap between the resist 2 and photomask 3 (proximity exposure gap), 27: section directly exposed to light, and 28a and 28b: sections exposed to diffracted light.

Exposure in this specification was determined by an ultraviolet ray illuminometer (Co., Ltd. ORC Seisakusho, Model UV-MO2) with light emitted from an extra high-voltage mercury lamp, irradiated after light components having a wavelength longer than 400 nm were cut off. UV-35 was used as a light receiving device of an ultra violet illuminometer.

In proximity exposure, production stability increases as proximity exposure gap 24 increases. Increasing proximity exposure gap 24, on the other hand, widens the sections 28a and 28b exposed to diffracted light. It should be noted, however, that exposure at the section 27 immediately below the opening and directly exposed to light is higher than that at the sections 28a and 28b exposed to diffracted light. The inventors of the present invention have found, after having extensively studied the relationship between exposure and developability, that there is an exposure range in which the section 27 directly exposed to light is selectively exposed to light and cured without being affected by diffracted light, reaching the present invention.

It is possible to sufficiently cure the directly exposed section selectively by controlling exposure at 14.0 to 70 mJ/cm$^2$, and to remove the light-shielded section, including the section exposed to diffracted light, by developing. It is therefore possible to pattern the resist 2 faithfully reflecting the pattern on the photomask 3. At an exposure below 14.0 mJ/cm$^2$, insufficient exposure will result at the directly exposed section, and the black matrix pattern may be damaged because of insufficient curing. At an exposure above 70.0 mJ/cm$^2$, on the other hand, the section exposed to diffracted light may be sufficiently exposed to be cured, distoring the black matrix pattern. The proximity exposure gap 24 is at least 30 μm long, preferably 80 to 220 μm long.

The black matrix of the present invention can be patterned faithfully reflecting the pattern on the photomask in detail, and is suitably applicable to the above-mentioned TFT type liquid crystal element, whose opening shape has fine irregularities. It takes no part in the step of forming a colored section of a color filter, and hence can be also used as the wall to prevent color contamination of the ink for the step of forming a colored section with a curable, jetted ink.

Therefore, it is possible to provide a high-quality color filter with the black matrix and colored section clearly demarcated from each other and a wide opening area by inking the opening of the black matrix of the present invention with jetted ink and curing it to form the colored section. It is also possible to produce a liquid crystal element of good color-displaying characteristics by placing the liquid crystal between two substrates, one of which is composed of the above color filter.

Figure 3:
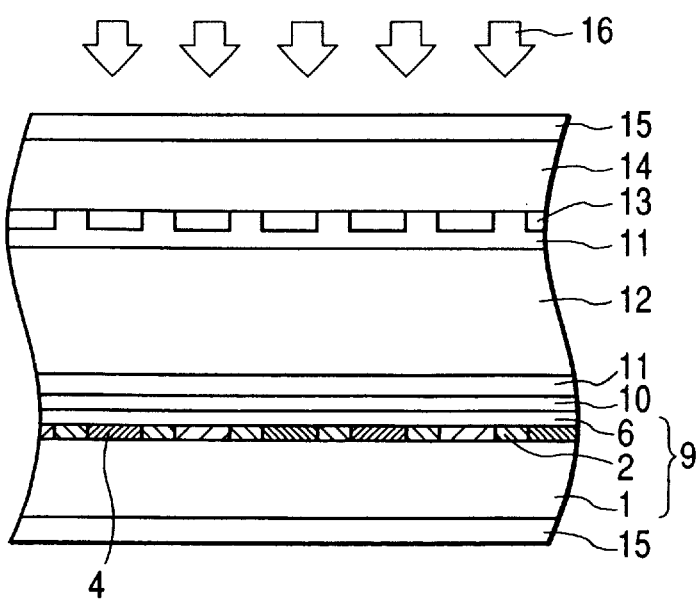
FIG. 3 shows a cross-sectional view of a liquid crystal element which uses a color filter produced by the method of the present invention.

FIG. 3 shows a cross-sectional view of the TFT color liquid crystal panel which incorporates the color filter produced by the method of the present invention. The panel form is not limited to the one shown in this figure.

A color liquid crystal panel is generally composed of a color filter substrate 1 and opposite substrate 14, with a liquid crystal composition 12 sealed in-between. The substrate 14 is provided with a TFT (not shown) and transparent image element electrode 13 arranged on the inner side in matrix. The other substrate 1 is provided with a color filter substrate 9 on the inner side in such a way that a color material of RGB faces the image element electrode 13, the color filter 9 being covered with a transparent electrode 10 (common electrode facing the image element electrode 13) over the entire surface. A black matrix is normally formed on the color filter substrate side. Each substrate is coated with an oriented film 11, which, when rubbing-finished, can orient the liquid crystal molecules with which it is in contact in a certain direction. Each substrate is further provided with a polarization plate 15 on the outer side. The liquid crystal composition 12 is sealed between these coated glass substrates 1 and 14, approximately 2 to 5 μm apart from each other. The liquid crystal composition works as a light shutter to vary permeability of back light for displaying information, where back light is emitted from a device normally composed of a fluorescent lamp and scattering plate, both not shown. 6 designates a protective layer which is formed on the color filter optionally.

Embodiments

In Embodiments and Comparative Examples described below, a black resist was exposed to light by an exposure machine (Canon Inc., PLA-700FA, illuminance: 14.2 mW/cm$^2$) at a proximity exposure gap of 50 μm. The substrate to be exposed was alkali-free glass of 5 in. a wafer, spin-coated with a resist material to a thickness of 1 μm and pre-baked at 80° C. for 180 sec.

Embodiments 1 and 2, and
Comparative Examples 1 and 2

Figure 4:
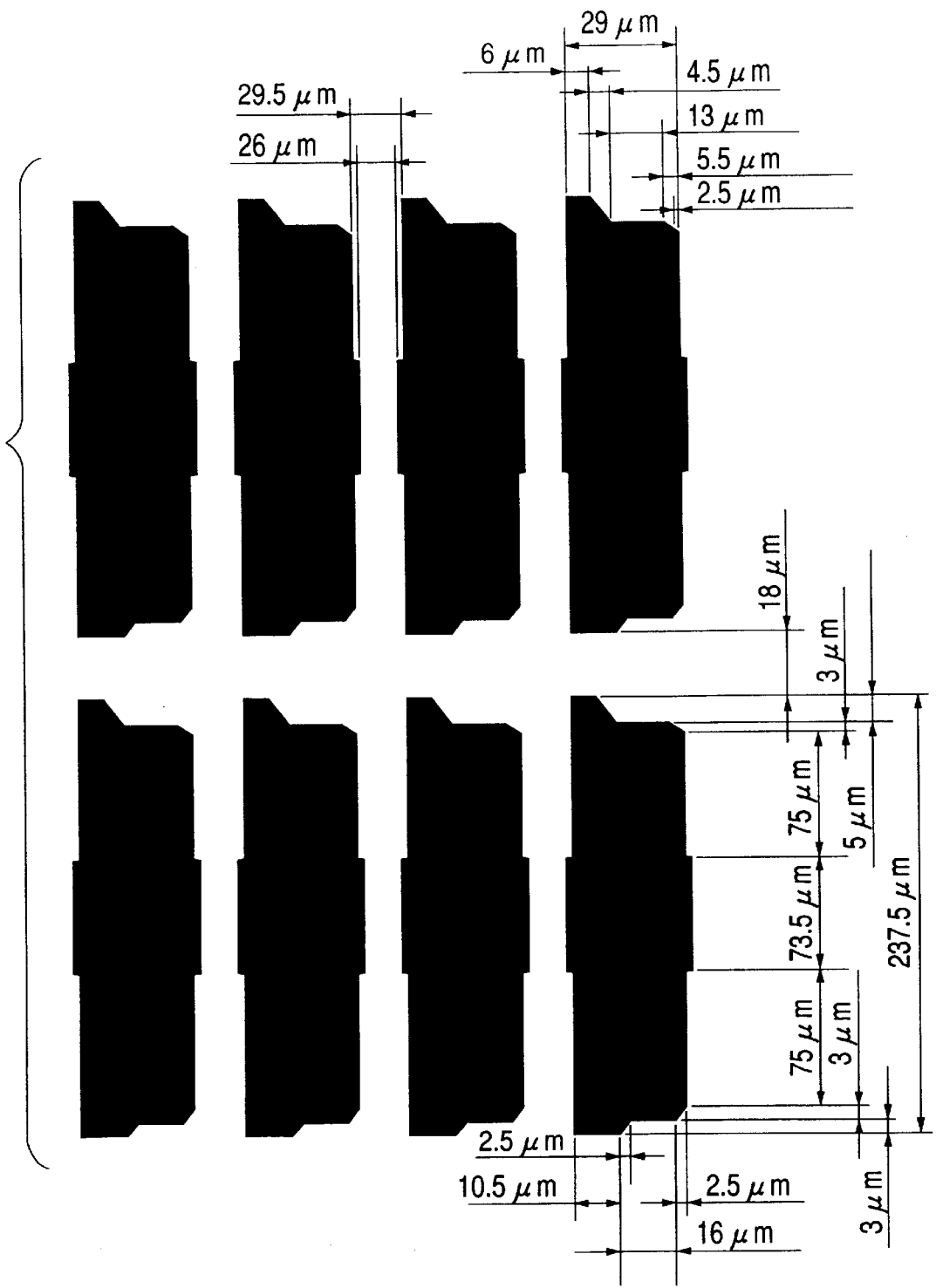
FIG. 4 shows part of a photomask shape used in one embodiment of the present invention.
Figure 7:
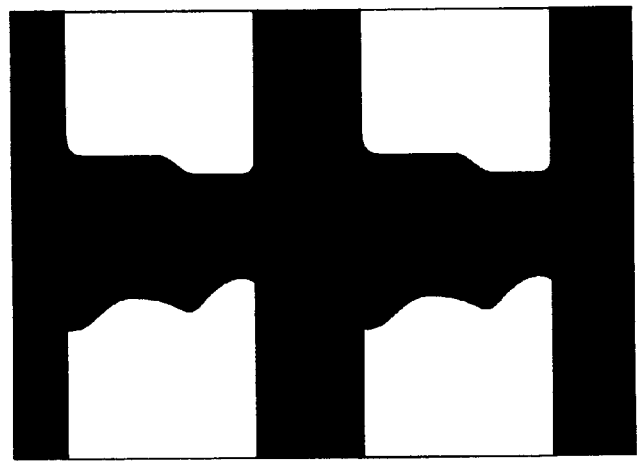
FIG. 7 is a photograph of a black matrix used in Embodiment 1 of the present invention.
Figure 8:
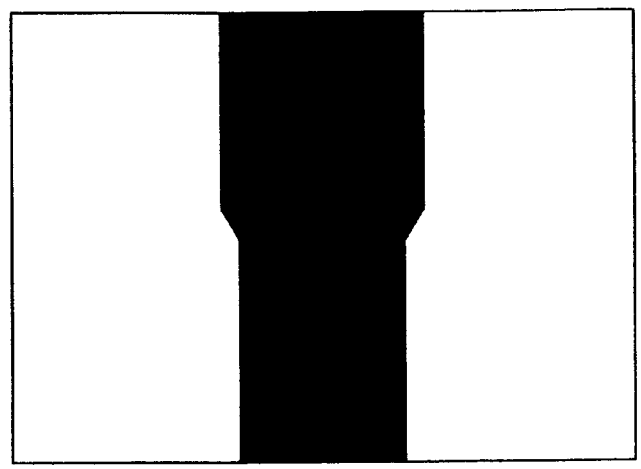
FIG. 8 is a photograph of a black matrix used in Embodiment 1 of the present invention.
Figure 9:
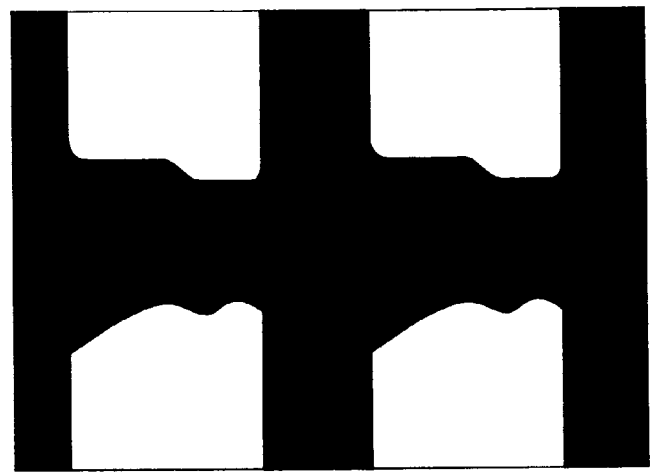
FIG. 9 is a photograph of a black matrix used in Embodiment 2 of the present invention.
Figure 10:
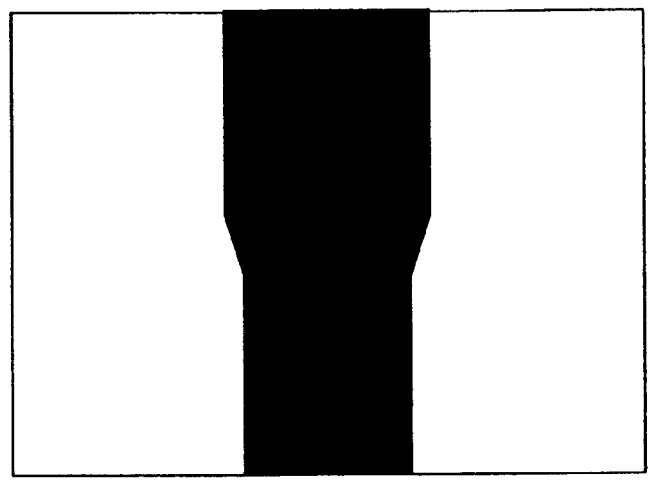
FIG. 10 is a photograph of a black matrix used in Embodiment 2 of the present invention.
Figure 11:
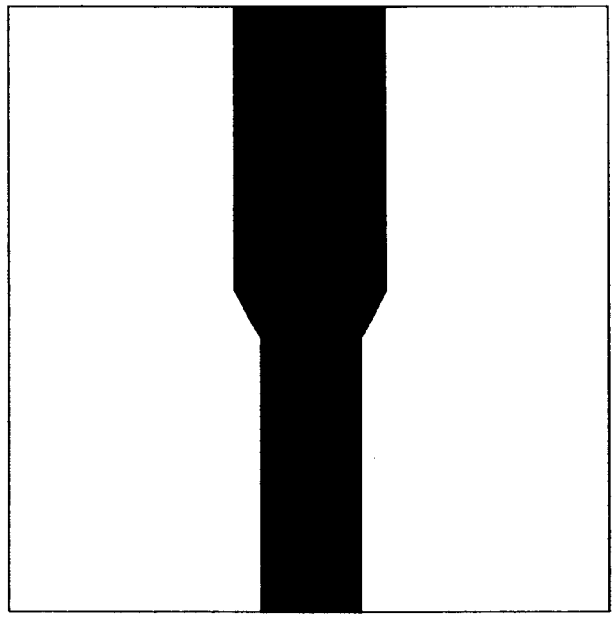
FIG. 11 is a photograph of a black matrix used in Comparative Example 1.
Figure 12:
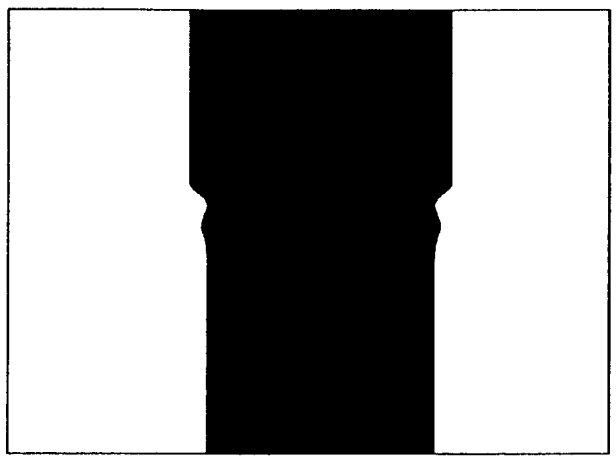
FIG. 12 is a photograph of a black matrix used in Comparative Example 2.

A black resist (Fuji Film Ohrin Co., Ltd., CK-S171X) was exposed using a photomask shown in FIG. 4 for 2.0 sec (Embodiment 1) and 4.9 sec (Embodiment 2), and using a photomask shown in FIG. 3 for 0.9 sec (Comparative Example 1) and using a photomask shown in FIG. 4 for 7.0 sec (Comparative Example 2). Each was immersed in a developing solution (20 vol. % solution manufactured by Fuji Film Ohrin Co., Ltd.'s CD) at 25° C. for 125 sec. and rinsed with high-pressure pure water jet (7 Pa) to form a pattern at an exposure of 28.4 mJ/cm$^2$ (Embodiment 1), 69.6 mJ/cm$^2$ (Embodiment 2), 12.8 mJ/cm$^2$ (Comparative Example 1) or 99.4 mJ/cm$^2$ (Comparative Example 23. Part of the black matrix produced is shown in FIGS. 7 and 8 (Embodiment 1), FIGS. 9 and 10 (Embodiment 2), FIG. 11 (Comparative Example 1), and FIG. 12 (Comparative Example 2).

As shown in FIGS. 7 to 12, each of the black matrices prepared by Embodiments 1 and 2 has a pattern faithfully transfered from the photomask. By contrast, the black matrix prepared by Comparative Example 1 is defective with pinholes on the pattern due to insufficient exposure, and that prepared by Comparative Example 2 is also defective with distortion due to excessive exposure causing exposure by diffracted light.

Embodiments 3 and 4, and
Comparative Examples 3 and 4

Figure 5:
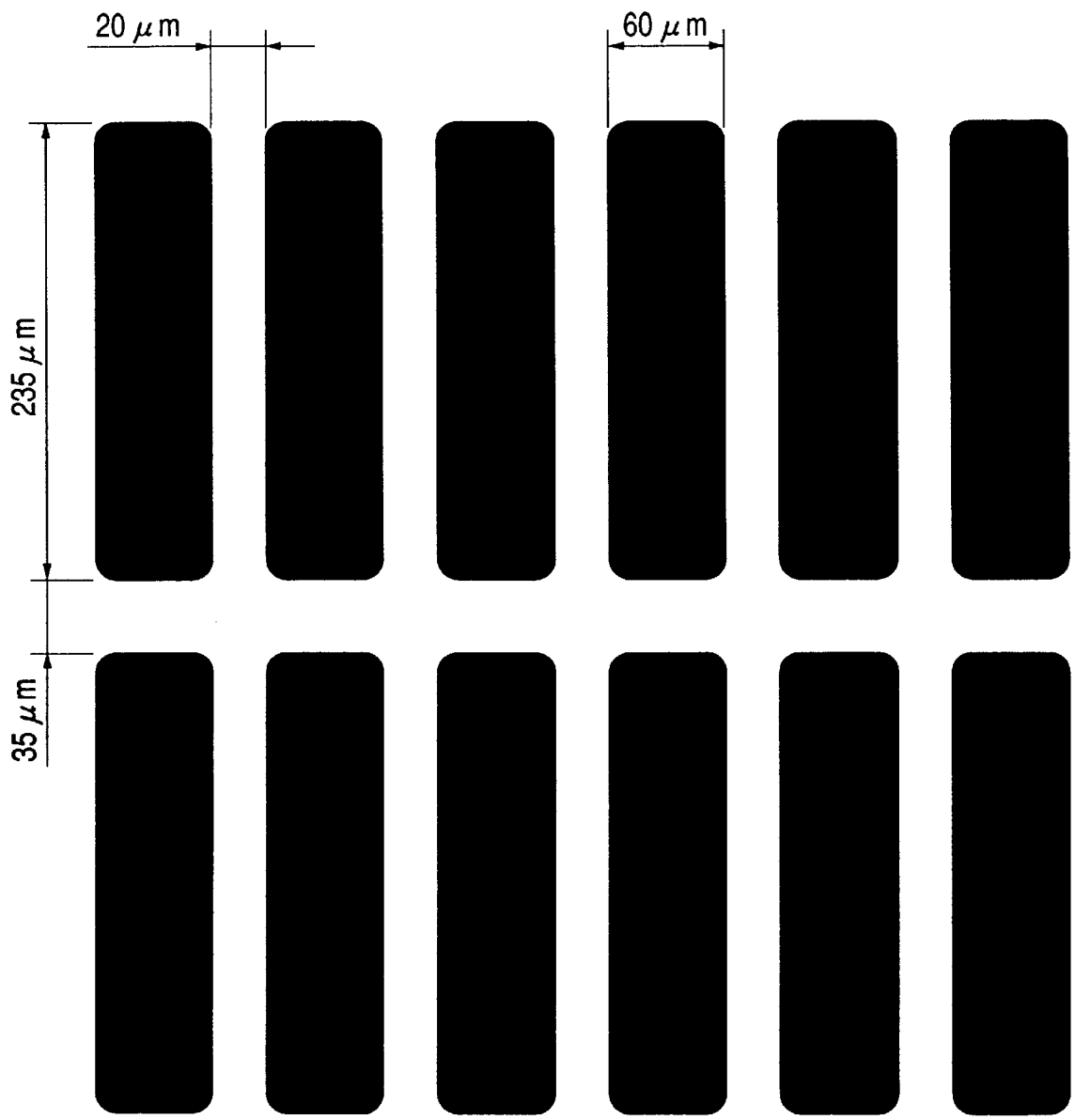
FIG. 5 shows part of a photomask shape used in another embodiment of the present invention.
Figure 6:
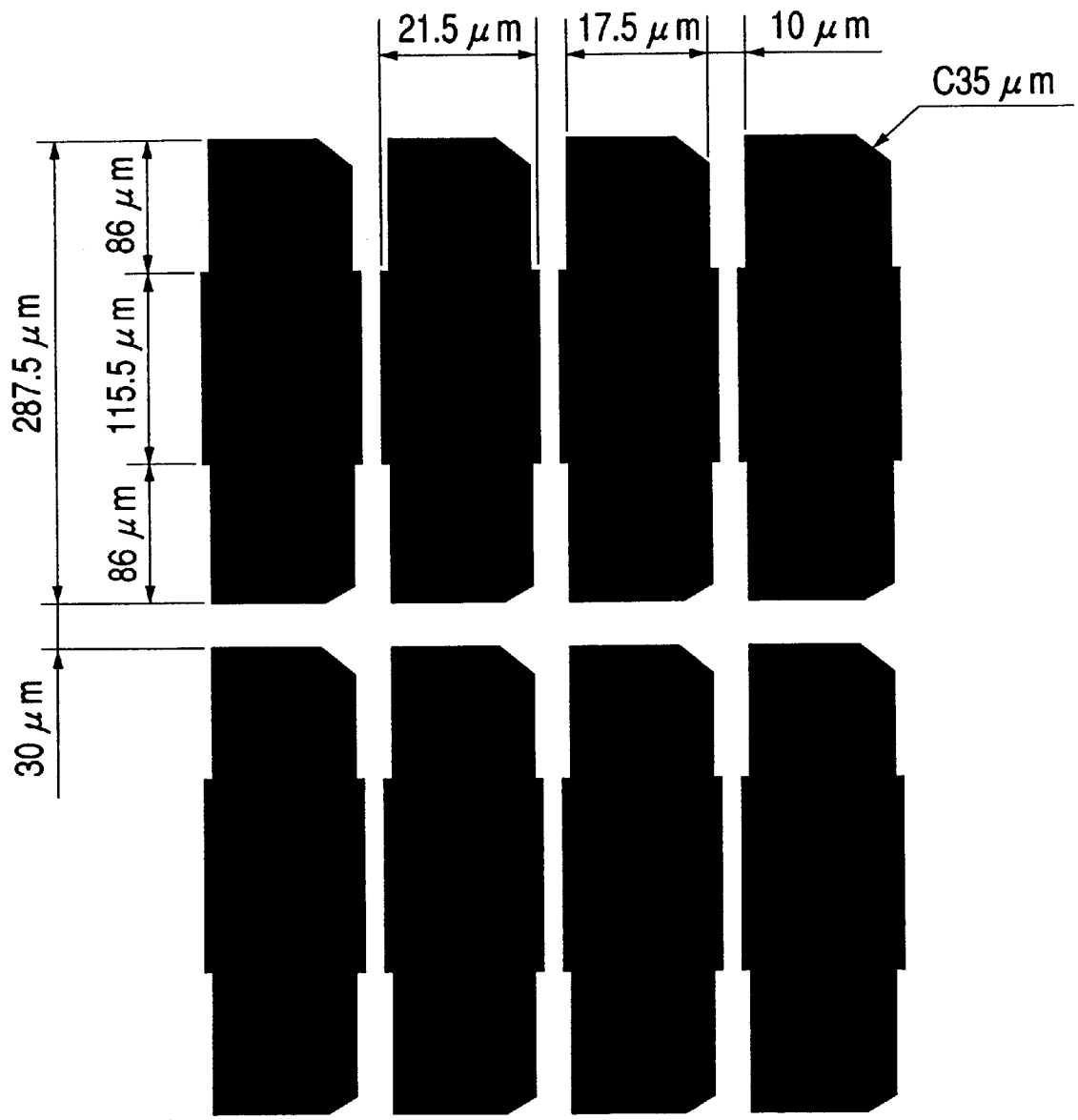
FIG. 6 shows part of a photomask shape used in still another embodiment of the present invention.
Figure 13:
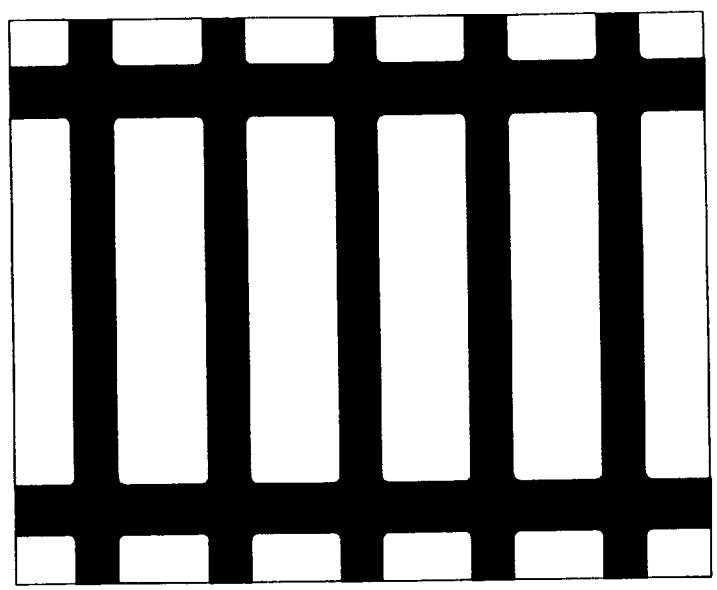
FIG. 13 is a photograph of a black matrix used in Embodiment 3 of the present invention.
Figure 14:
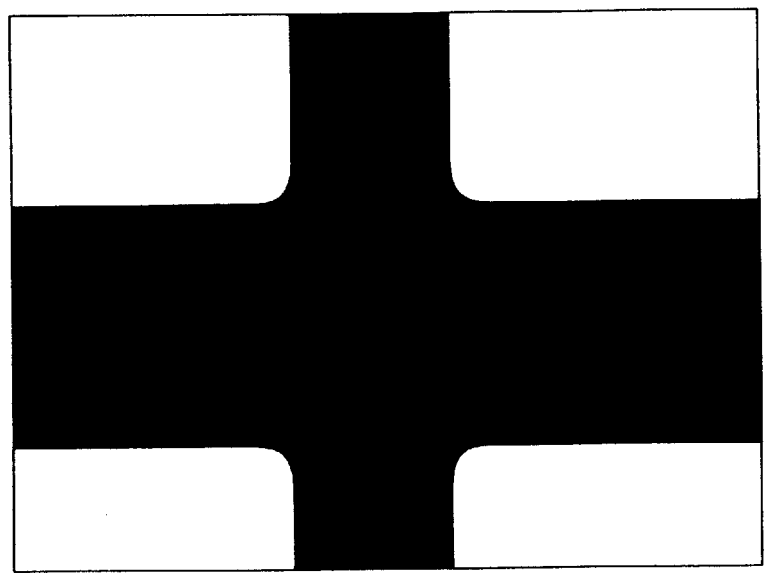
FIG. 14 is a photograph of a black matrix used in Embodiment 3 of the present invention.
Figure 15:
FIG. 15 is a photograph of a black matrix used in Embodiment 4 of the present invention.
Figure 16:
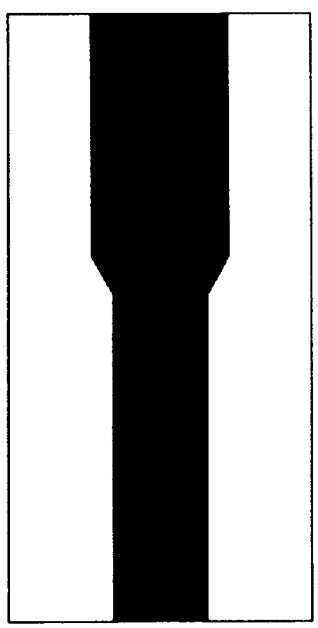
FIG. 16 is a photograph of a black matrix used in Embodiment 4 of the present invention.
Figure 17:
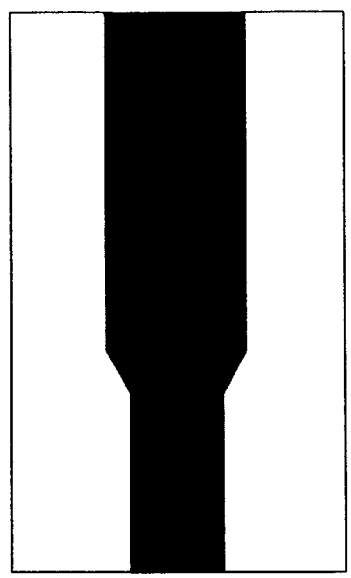
FIG. 17 is a photograph of a black matrix used in Comparative Example 3.
Figure 18:
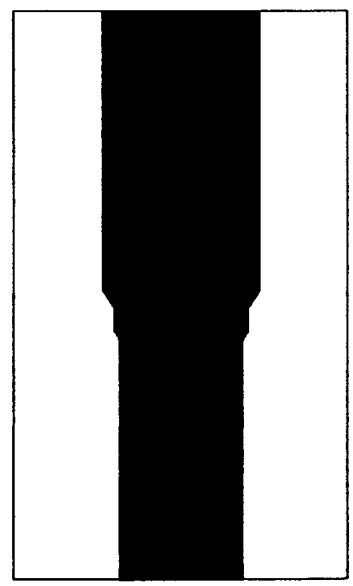
FIG. 18 is a photograph of a black matrix used in Comparative Example 4.

A black resist (Tokyo Ohka Kogyo Co., Ltd., CFPR-BK-416) was exposed using a photomask shown in FIG. 5 for 1.0 sec (Embodiment 3), and using a photomask shown in FIG. 6 for 4.0 sec (Embodiment 4). 0.8 sec (Comparative Example 3) and 5.0 sec (Comparative Example 4). Each was immersed in a developing solution (10 vol. % solution manufactured by Tokyo Ohka Kogyo Co., Ltd. N-A3K) at 25° C. for 55 sec, and rinsed with sprayed pure water (0.5 Pa) to form a pattern at an eaxposure of 14.2 mJ/cm$^2$ (Embodiment 3), 56.8 mJ/cm$^2$ (Embodiment 4), 11.4 mJ/cm$^2$ (Comparative Example 3) or 71.0 mJ/cm$^2$ (Comparative Example 4). Part of the black matrix produced is shown in FIGS. 13 and 14 (Embodiment 3), FIGS. 15 and 16 (Embodiment 4), FIG. 17 (Comparative Example 3), and FIG. 18 (Comparative Example 4).

As shown in FIGS. 13 to 18, each of the black matrices prepared by Embodiments 3 and 4 has a pattern faithfully transferred from the photomask. By contrast, the black matrix prepared by Comparative Example 3 is defective with a pattern partly lost by development due to insufficient exposure, and that prepared by Comparative Example 4 is also defective with distortion due to excessive exposure causing exposure by diffracted light.

Embodiments 5 and 6, and
Comparative Examples 5 and 6

Figure 19:
FIG. 19 is a photograph of a black matrix used in Embodiment 5 of the present invention.
Figure 20:
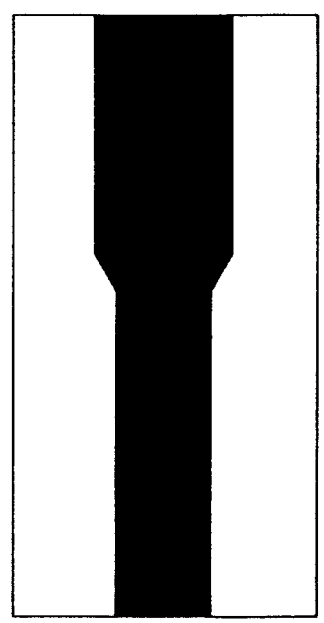
FIG. 20 is a photograph of a black matrix used in Embodiment 5 of the present invention.
Figure 21:
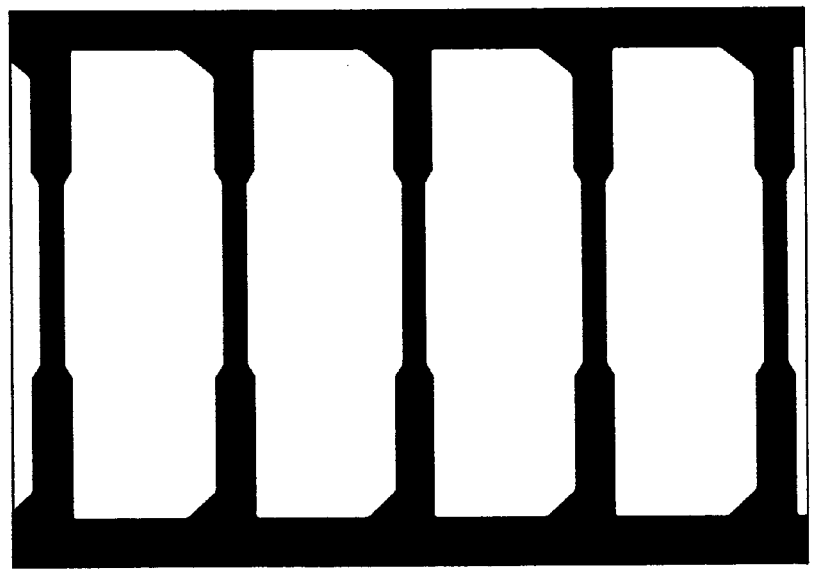
FIG. 21 is a photograph of a black matrix used in Embodiment 6 of the present invention.
Figure 22:
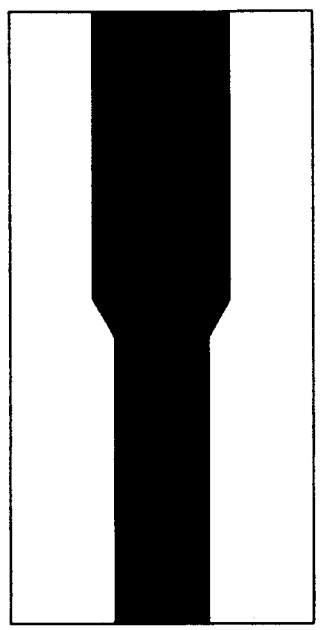
FIG. 22 is a photograph of a black matrix used in Embodiment 6 of the present invention.
Figure 23:
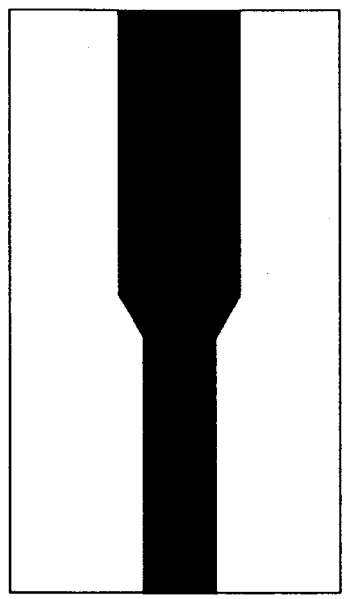
FIG. 23 is a photograph of a black matrix used in Comparative Example 5.
Figure 24:
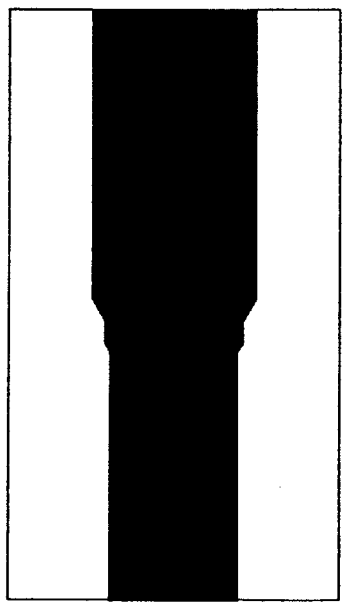
FIG. 24 is a photograph of a black matrix used in Comparative Example 6.

A black resist (V-259-BK-739P) manufactured by Nippon Steel Chemical Co., Ltd. was exposed using a photomask shown in FIG. 6 for 1.0 sec (Embodiment 5), 4.9 sec (Embodiment 6), 0.6 sec (Comparative Example 5) and 6.0 sec (Comparative Example 6). Each was immersed in a developing solution (1 vol. % solution V-259ID) manufactured by Nippon Steel Chemical Co., Ltd. at 25° C. for 18 sec. and rinsed with sprayed pure water (0.5 Pa) to form a pattern at an exposure of 14.2 mJ/cm$^2$ (Embodiment 5), 69.6 mJ/cm$^2$ (Embodiment 6), 8.5 mJ/cm$^2$ (Comparative Example 5) or 85.2 mJ/$^2$ (Comparative Example 6). Part of the black matrix produced is shown in FIGS. 19 and 20 (Embodiment 5), FIGS. 21 and 22 (Embodiment 6), FIG. 23 (Comparative Example 5), and FIG. 24 (Comparative Example 6).

As shown in FIGS. 19 to 24, each of the black marices prepared by Embodiments 5 and 6 has a pattern faithfully transferred from the photomask. By contrast, the black matrix prepared by Comparative Example 5 is defective with a pattern partly lost by developed due to insufficient exposure, and that prepared by Comparative Example 6 is also defective with distortion due to excessive exposure causing exposure by diffracted light.

The optimum exposure levels for the resists prepared by Embodiments 1 to 6 and Comparative Examples 1 to 6 are given in Table 1.

TABLE 1

| Resist materials | Optimum exposure (mJ/cm$^2$) |
| --- | --- |
| CK-S171X | 28.4 to 69.6 |
| CFPR-BK-416 | 14.2 to 56.8 |
| V-259-BK-739P | 14.2 to 69.6 |

As shown in Table 1, proximity exposure gives a black matrix having a pattern faithfully transferred from a photomask, when effected at an exposure in the optimum range specified by the present invention.

As described above, the method of the present invention gives a black matrix of desired pattern even by proximity exposure. It also provides a color filter of excellent filter characteristics and liquid crystal element of excellent color-displaying characteristics using the above black matrix. It substantially reduces exposure time, bringing about the effects of reduced production tact and thereby improving productivity.

What is claimed is:

1. A method for producing a black matrix of resin, comprising the steps of:

forming a resist on a substrate;

exposing the resist at an exposure of 14.0 to 70.0 mJ/cm$^2$ via a photomask disposed at a proximity exposure gap of 30–220 μm; and developing the exposed resist to produce a pattern.

2. A method for producing a black matrix of resin, comprising the steps of:

forming a resist on a substrate;

exposing the resist at an exposure of 14.0 to 70.0 mJ/cm$^2$ via a photomask disposed at a proximity exposure gap of 80–220 μm; and developing the exposed resist to produce a pattern.

3. A method for producing a black matrix of resin of claim 1 or 2, characterized in that said pattern has an irregular outer shape.

4. A method for producing a color filter substrate, characterized in that the opening of said black matrix of resin prepared by the method of claim 1 or 2 is inked with a jetted ink to form a colored section.

5. A method for producing a color filter substrate of claim 4, characterized in that said ink is thermosetting.

6. A method for producing a color filter substrate of claim 4, characterized in that said ink and black matrix of resin are simultaneously cured.

7. A liquid crystal displaying element characterized by comprising two substrates facing each other, one of which is the color filter substrate prepared by the method of claim 4, sealing liquid crystal in-between.

* * * * *